T. A. MORAN.
THILL COUPLING.
APPLICATION FILED AUG. 13, 1907.

911,897.

Patented Feb. 9, 1909.
2 SHEETS—SHEET 1.

Inventor
T. A. Moran,

Witnesses

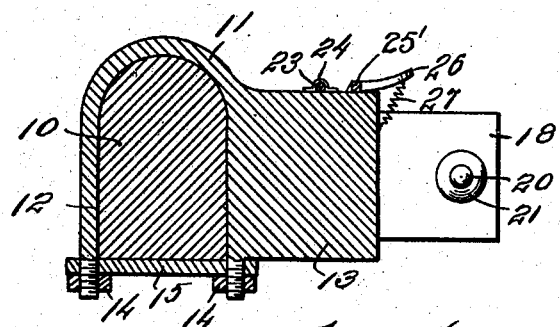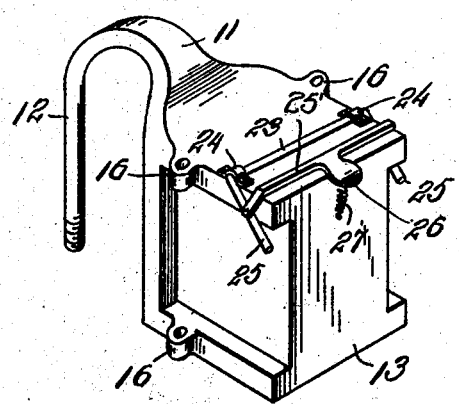

UNITED STATES PATENT OFFICE.

THOMAS A. MORAN, OF MANKATO, MINNESOTA.

THILL-COUPLING.

No. 911,897.     Specification of Letters Patent.     Patented Feb. 9, 1909.

Application filed August 13, 1907. Serial No. 388,400.

*To all whom it may concern:*

Be it known that I, THOMAS A. MORAN, a citizen of the United States, residing at Mankato, in the county of Blue Earth, State of Minnesota, have invented certain new and useful Improvements in Thill-Couplings; and I do hereby declare the following to be a full, clear, and exact description of the invention, such as will enable others skilled in the art to which it appertains to make and use the same.

This invention relates to new and useful improvements in thill couplings and more particularly to a thill coupling comprising pivoted coupling links and a spring held latching device for holding said links against accidental displacement.

Figure 1:
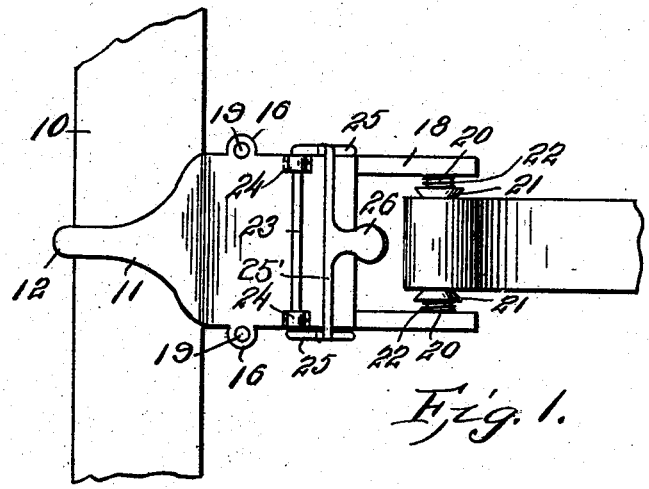
Figure 2:
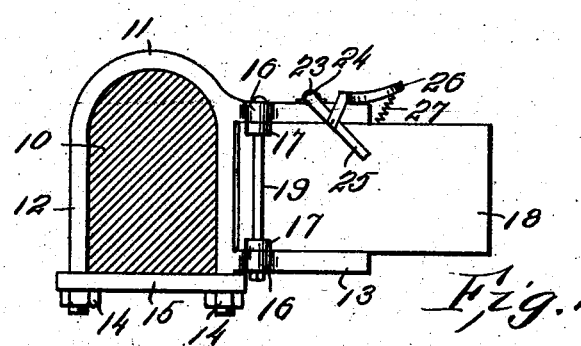
Figure 3:
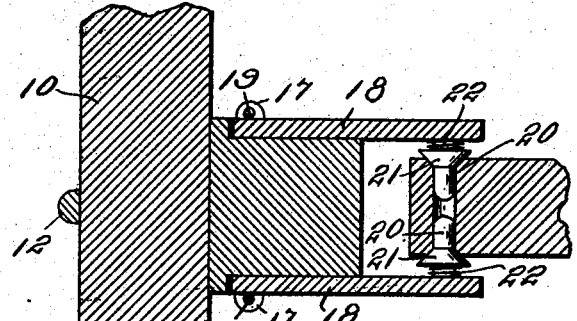

In connection with a thill coupling of the above type, the invention aims as a primary object to provide a novel construction, combination and arrangement of parts, the details of which will appear in the course of the following description in which reference is had to the accompanying drawings, forming a part of this specification, like characters of reference designating similar parts, throughout the several views, wherein:

Figure 1 is a top plan view showing the manner of use of the thill coupling constructed in accordance with the present invention. Fig. 2 is a side elevation thereof. Fig. 3 is a central horizontal sectional view. Fig. 4 is a central longitudinal sectional view. Fig. 5 is a detailed perspective view of a bracket comprehended in the invention.

In the accompanying drawings, the numeral 10 denotes the axle tree and the numeral 11 denotes a member including a U bolt 12 straddling the axletree and a forwardly projecting bracket 13. The bolt 12 has the lower end of its legs threaded to receive nuts 14 which hold a clamping plate 15.

The bracket 13 is provided at opposite sides thereof with upper and lower alined apertured lugs 16 which coöperate with lugs 17 on the coupling links 18 to surround pivot pins 19. The links 18 are formed at their outer ends with laterally and inwardly projecting pins 20 which terminate short of one another and which carry conical washers 21 forced inwardly into engagement with the thills by expansive coil springs 22 surrounding the pins 20. It will thus be seen that the links 18 are capable of movement in a horizontal plane to disengage the pins 20 from the thills. For the purpose of holding said links against accidental displacement a latching device is employed which comprises a transverse shaft 23 mounted in bearings 24 carried by the bracket 13 and formed at its ends with parallel forwardly and downwardly projecting arms 25 which bear against the links 18.

The arms 25 are connected by a transverse bar 25' carrying at a central point a projecting finger piece 26 to which is connected a retractile coil spring 27 the other end of said spring being connected to the bracket 13. It will be apparent that the spring 27 will hold the shaft 23 in such position that the arms 25 will overlie the sides of the links 18 for the purpose above noted, and that movement of said arms to permit of the disengagement of the links 18 is had by turning the shaft 23, the finger piece 26 affording a ready means for such action.

The invention is simple in its structural details, inexpensive to manufacture and practical and efficient in use.

From the foregoing description it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of the invention as defined in the appended claims.

What is claimed is:

1. In a thill coupling, a bracket, oppositely arranged links hinged to the bracket, an inwardly projecting pin carried by each of the links, and a spring pressed washer carried by each of the pins.

2. A thill coupling of the class described, comprising a stationary bracket, thill coupling links pivoted thereto for movement towards and away from each other in engaging and disengaging the thills, inwardly directed pins carried by the links, spring controlled washers on the pins, a shaft mounted transversely of said bracket, arms carried by said shaft and formed to overlie said coupling links to hold the same in engagement with said thills, and tension means for holding the arms in operative position.

3. A thill coupling of the class described, comprising a stationary bracket, thill coupling links pivoted thereto for movement towards and away from each other in engaging and disengaging the thill, a shaft mounted transversely of said bracket and having depending arms at opposite ends normally overlying the links to hold the same against movement, a pin on the inner face of each link, yieldable members carried by the pins, and tension means for holding the arms in their normal position.

In testimony whereof, I affix my signature, in presence of two witnesses.

THOMAS A. MORAN.

Witnesses:
HARRISON G. SCHMITT,
H. W. VOLK.